Figure 1:
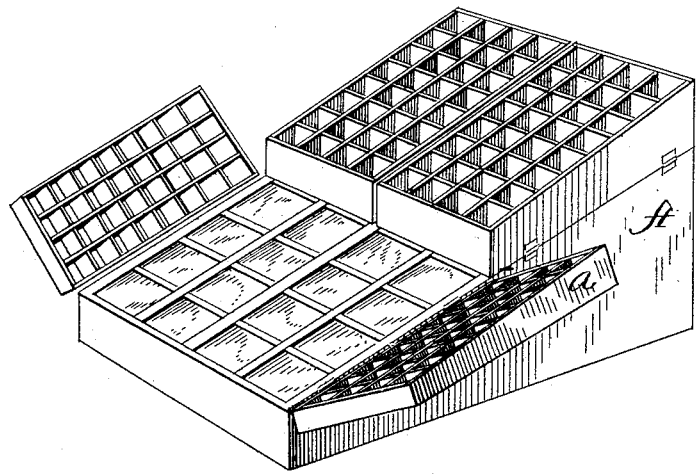

(No Model.)  2 Sheets—Sheet 1.

A. P. FLAGLOR.
DEVICE FOR MODIFYING AND CONTROLLING RAYS OF LIGHT FOR PHOTOGRAPHIC PURPOSES.

No. 483,606.  Patented Oct. 4, 1892.

Witnesses
W. P. Keene.
F. L. Middleton.

Inventor
Amasa P. Flaglor
by Spear & Lee
Attys.

(No Model.) 2 Sheets—Sheet 2.
A. P. FLAGLOR.
DEVICE FOR MODIFYING AND CONTROLLING RAYS OF LIGHT FOR PHOTOGRAPHIC PURPOSES.
No. 483,606. Patented Oct. 4, 1892.
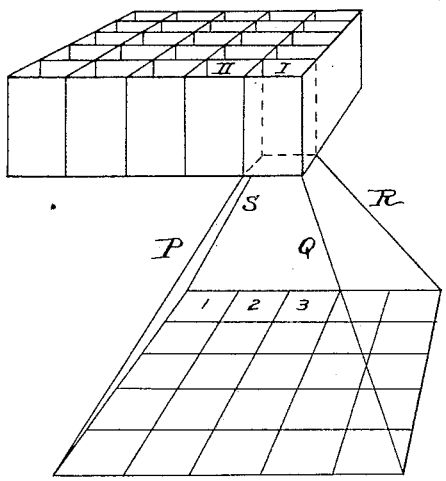
Fig. 3.
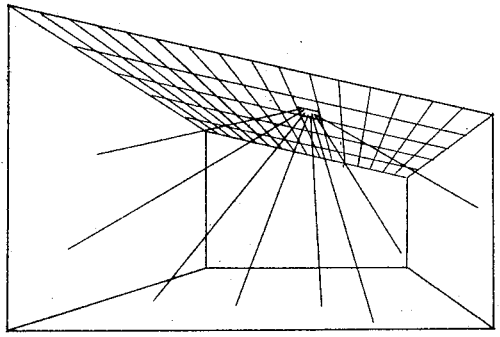
Fig. 4.
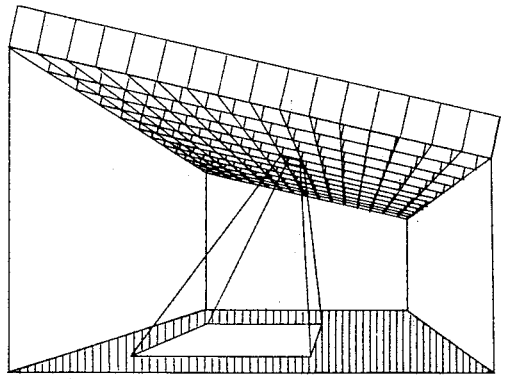
Fig. 5.
Fig. 6.
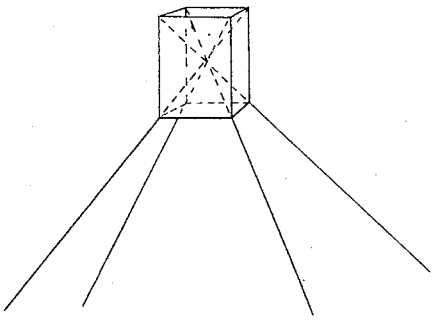
Witnesses
W. P. Keene
T. J. Johnston
Inventor
Amasa P. Flaglor,
by Spear & Suly
Attys

UNITED STATES PATENT OFFICE.

AMASA P. FLAGLOR, OF SAN FRANCISCO, CALIFORNIA, ASSIGNOR TO HELEN FLAGLOR, OF SAME PLACE.

DEVICE FOR MODIFYING AND CONTROLLING RAYS OF LIGHT FOR PHOTOGRAPHIC PURPOSES.

SPECIFICATION forming part of Letters Patent No. 483,606, dated October 4, 1892.

Application filed October 9, 1890. Serial No. 367,515. (No model.)

*To all whom it may concern:*

Be it known that I, AMASA P. FLAGLOR, a citizen of the United States, and a resident of the city and county of San Francisco, State of California, have invented certain new and useful Improvements in Devices for Modifying and Controlling Rays of Light for Photographic and other Purposes; and I do hereby declare that the following is a full, clear, and exact description of the same.

One of the most important aids to successful photography is the maintaining of a proper light in the operating room or studio. It is the aim of all photographers to obtain an evenly-diffused reflected light, which after its entrance through the skylight is modified by various arrangements of screens, so as to fall upon the object or person in the proper way to produce the best results as to light and shade. The entrance of the direct rays of the sun into the studio completely spoils many pictures, which would otherwise be perfectly successful, because such rays, not being perfectly diffused, create sharp and unnatural shadows, which destroy the effect of the picture no matter how carefully and artistically it may be taken and finished. Even if the direct rays of the sun cannot enter the skylight, the reflected rays, entering at all angles, require a very careful arrangement of interior screens to properly diffuse them. The usual means employed in northern latitudes for securing light for photography is an inclined skylight facing as nearly as possible north, so that the direct rays of the sun cannot enter it during the greater part of the day; but in the morning and afternoon in winter and during the entire day in summer it is almost impossible to so arrange the skylight that no direct rays can enter it. It is the custom of photographers, therefore, to provide screens within the studio for the purpose of absorbing as many as possible of these rays. This at the best is not wholly satisfactory; and it is the object of my invention to provide an attachment for a skylight or other opening used to admit light, which may be permanent or not, as desired, and which will intercept and absorb any direct rays from the sun that otherwise would enter the skylight and at the same time will intercept and prevent the admission of all the indirect or reflected rays except those which enter approximately at right angles to the plane of the skylight. The result of this is the production at all times of a pure, soft, and equally-diffused reflected light and a consequent improvement in the quality of the photographs taken.

My apparatus consists, broadly, of a number of cells or tubes open at both ends, arranged relatively to the skylight or other opening for the purpose of intercepting the direct rays of sunlight, and also for the purpose of preventing the admission of all indirect or reflected rays, excepting those which enter the tubes in lines substantially parallel with their walls.

I have illustrated my invention with accompanying drawings, in which—

Figure 2:
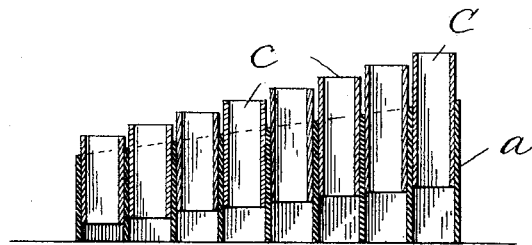

Figure 1 is a perspective view of a skylight provided with my attachment. Fig. 2 is a longitudinal section through a nest of tubes or cells, showing a telescopic adjustment of such tubes or cells. Fig. 3 is a diagram illustrating the action of the light-rays entering a single tube. Fig. 4 is a perspective view of an apartment to which light is admitted through a single opening unprovided with a tube. Fig. 5 is a similar view illustrating the admission of light through a similar opening provided with one of my tubes or cells. Fig. 6 is a diagram showing the approximate direction of light-rays passing through a single cell or tube.

A represents an ordinary photographer's skylight, which for the sake of simplicity I have indicated as being outside the roof of a building, although the general way of constructing skylights for this purpose is to sink them partially in and below the roof. The construction and arrangement of the skylight are, however, quite immaterial. Upon the top of the skylight I place a number of tubes or cells formed from any suitable material substantially opaque, such as wood, papier-maché, or light sheet metal. I prefer to construct these cells with a surrounding frame $a$, so that a single structure is produced which is better adapted to transportation, and any number of such structures may be used, according to the size of the skylight. Thus in Fig. 1 I have shown four separate sections of tubes, which are in this case hinged to the skylight-frame. Fig. 2 shows a longitudinal section through a number of these tubes or cells. I prefer to form them as shown, gradually decreasing in height from the rear to the front in order that the longer tubes may be at the rear, where the rays of light fall more directly and at a less angle than upon those in front.

I am enabled to adjust this apparatus to all conditions as respects time of day or season of the year by providing a series of sliding telescopic tubes C, which fit within the main tubes, Fig. 2, and which may be pulled out to a greater or less extent, as may be desired.

In Figs. 3, 4, 5, and 6 I have illustrated the direction of the divergent rays entering the room. In Fig. 3 the lines marked P, Q, S, and R indicate the general pyramidal form of the rays of light passing through one tube or section of the series. The bottom of the pyramid or the floor on which it falls is of course many times larger in area than the tube itself, and this is indicated by the squares numbered, for example, 1, 2, and 3. It is apparent that light from the other tubes or sections around the one specifically illustrated will overlap the squares represented in Fig. 3, and that the pyramids of light will mutually overlap and the reflected rays intermingle, thus diffusing the light generally and evenly and with the uniform effect herein described.

The operation of this attachment requires no extended description. It is clear that if the tubes are sufficiently long and the sun is in any position excepting directly overhead none of its direct rays can enter the skylight. Such rays, whether from south, east, or west, will strike the walls of the cells and will be partly absorbed and partly reflected against the opposite wall. It is therefore impossible for any direct rays of the sun to enter the skylight or any portion of it covered by these tubes. In mid-summer, when the sun is high in the heavens, the tubes or cells may be lengthened by pulling out the telescopic slides to as great an extent as may be necessary to prevent any of the direct rays of the sun from passing through such tubes or cells without being absorbed or reflected by their walls.

In placing my apparatus in position—for example, in connection with a photographer's skylight—it is only necessary to consider the position of the sun at its highest point upon the 21st of June and the angle of the skylight relatively to the horizontal. The position of the sun is well known at any given latitude and the angle of the skylight is of course easily ascertained. It is only necessary, then, that upon that day at twelve m. the ratio of length to the diameter of tubes be such as to prevent any direct rays of the sun from striking below their walls and so entering the room. Upon every other day of the year the same result must necessarily be produced. I prefer to paint the inside of the tubes black, in order to absorb as many as possible of the rays which strike them. The effect of these tubes is the same with reference to rays of reflected light which ordinarily enter the skylight at all angles. It is evident that only such rays as enter the tubes in line with their walls or approximately at right angles to the plane of the skylight will be admitted to the latter.

I do not limit myself to any particular number, size, shape, or material for the tubes nor to placing them at any particular angle, since it is evident that my device may be varied in these respects without departing from the spirit of the invention embodied by it. It is evident, also, that it may be applied to windows and side lights as well as skylights with the same results, and also that it may be placed below or in instead of on the top of the skylight.

It is also clear that my device may be used for the purpose of admitting a more or less brilliant or intense light into the room for special purposes. Thus if the interior of the tubes be polished or they be painted white or some light color the rays of the sun, instead of being absorbed, would be reflected by such walls into the room. At the same time the light would be diffused and the disadvantages produced by the admission of intense direct rays would be entirely obviated.

By taking advantage of the well-known principles of optics that rays of light always travel in straight lines, and that their angle of incidence is equal to their angle of reflection I am enabled to provide an attachment by which I can perfectly regulate and control the admission of light at all times. As all the light enters the opening in lines approximately at right angles to it, the management of interior screens is greatly simplified, since no provision need be made for cross-lights entering at different angles. At the same time light may be admitted at all times through the whole surface of the skylight, and it is no longer necessary to shade or curtain part of it, as must now be done to prevent the admission of direct sun-rays.

While I have described this invention as particularly applicable to photographers' skylights, it is evident that it may be used in many other situations where the regulation of rays of light is of importance. Thus in artists' studios and art galleries, in libraries and museums, in churches and halls, and in public and private buildings of all kinds where sufficient light is required and yet it is desirable to exclude the sun's direct rays, my invention can be applied to the openings which admit light with the same advantageous results as have been heretofore set forth.

I claim as my invention—

1. The combination, with a skylight or other opening for the admission of light, of a device consisting of a number of tubes or cells so arranged that the direct rays of the sun will always be prevented from striking below the walls of said tubes or cells.

2. The combination, with a skylight, of a nest of tubes or cells substantially opaque and open at both ends for the admission of light, constructed in separate sections and placed upon said skylight and arranged to intercept the direct rays of light and to cause the reflected rays to enter in line substantially parallel with their walls, substantially as and for the purpose set forth.

3. In combination with a skylight, a nest of tubes or cells open at both ends for the admission of light, constructed in separate sections, each section being separately hinged to the skylight, substantially as set forth.

4. The combination, with a skylight, of a series of tubes or cells open at both ends for the admission of light, decreasing successively in height from rear toward the front, substantially as and for the purpose set forth.

5. The combination, with a series of tubes or cells open at both ends for the admission of light for the purpose described, of separate telescopic tubes sliding within the same, substantially as set forth.

In testimony whereof I have hereunto affixed my signature, in the presence of witnesses, on the 22d day of September, 1890.

AMASA P. FLAGLOR.

Witnesses:
L. W. SEELY,
H. J. LANG.